United States Patent
Lampell

(10) Patent No.: US 8,473,419 B1
(45) Date of Patent: Jun. 25, 2013

(54) DEPENDENCY RESOLUTION IN PUBLISH/SUBSCRIBE

(75) Inventor: David Lampell, Poughkeepsie, NY (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/245,717

(22) Filed: Sep. 26, 2011

(51) Int. Cl.
*G06Q 10/00* (2012.01)

(52) U.S. Cl.
USPC ........... 705/301; 707/629; 707/630; 707/631; 707/632; 709/206; 718/106

(58) Field of Classification Search
USPC .................. 705/301; 707/630–632, 623, 629, 707/636; 709/206; 718/106
See application file for complete search history.

(56) References Cited

U.S. PATENT DOCUMENTS

| | | |
|---|---|---|
| 2005/0203949 A1 | 9/2005 | Cabrera et al. |
| 2007/0027915 A1* | 2/2007 | Morris ........................ 707/104.1 |
| 2007/0156878 A1* | 7/2007 | Martin et al. ................. 709/223 |
| 2008/0133541 A1* | 6/2008 | Fletcher et al. ................. 707/10 |
| 2009/0182574 A1 | 7/2009 | Beardall et al. |
| 2009/0187635 A1 | 7/2009 | Lobban et al. |
| 2009/0228563 A1 | 9/2009 | Jones et al. |
| 2011/0060957 A1 | 3/2011 | Bogucharov et al. |
| 2011/0137950 A1 | 6/2011 | Deng et al. |

OTHER PUBLICATIONS

Tarari Releases Five XML Performance Benchmarks; Extreme Acceleration Obtainable with RAX 4 for XML Schema Validation, XML Content-Based Routing, XML Publish-Subscribe, Federated Identity Management/SAML, and Binary XML, May 3, 2005, Business Wire, pp. 1-3.*

* cited by examiner

*Primary Examiner* — Candice D Wilson
*Assistant Examiner* — Ehrin Pratt
(74) *Attorney, Agent, or Firm* — Sterne, Kessler, Goldstein and Fox PLLC

(57) ABSTRACT

Disclosed herein are methods and systems for enforcing dependencies in an account management system using publish/subscribe. Messages containing account information may be published and received by one or more account servicers. Account servicers may not perform account management tasks based on a message unless the message satisfies a keyword, which may express dependencies of the account servicer. Keywords may be based on the content of received messages. If a received message matches a keyword, the account servicer may perform an account management task, and cause a subsequent message to be published with an additional keyword related to the account servicer.

19 Claims, 5 Drawing Sheets

DEPENDENCY RESOLUTION IN PUBLISH/SUBSCRIBE

BACKGROUND

1. Field

Embodiments relate to account management systems using publish/subscribe.

2. Background

Publish/subscribe is a framework in which messages from publishers are distributed without knowledge of the recipient of such a message, and without any specific notation of the desired recipient or recipients of such a message.

Account management systems may include multiple account servicers, each of which may depend on another account servicer before an account management task can be performed. Dependencies may be enforced by a centralized server that ensures all dependencies are met before an account servicer can perform an account management task. This requires the centralized server to have knowledge of each dependency.

BRIEF SUMMARY

Methods, systems, and computer readable storage medium are provided for enforcing dependencies in an account management system using publish/subscribe. In an embodiment, a first account servicer receives a message intended for a plurality of recipients. Each recipient is responsible for one or more account management tasks. The first message includes an element of account data and a first keyword associated with an account servicer that is the source of the first message. The first account servicer may determine whether the first message matches the first keyword. If the first message matches the first keyword, the first account servicer performs an account management task, based on the first message. The first account servicer then causes a second message to be published. The second message includes the first message and a second keyword associated with the first account servicer.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
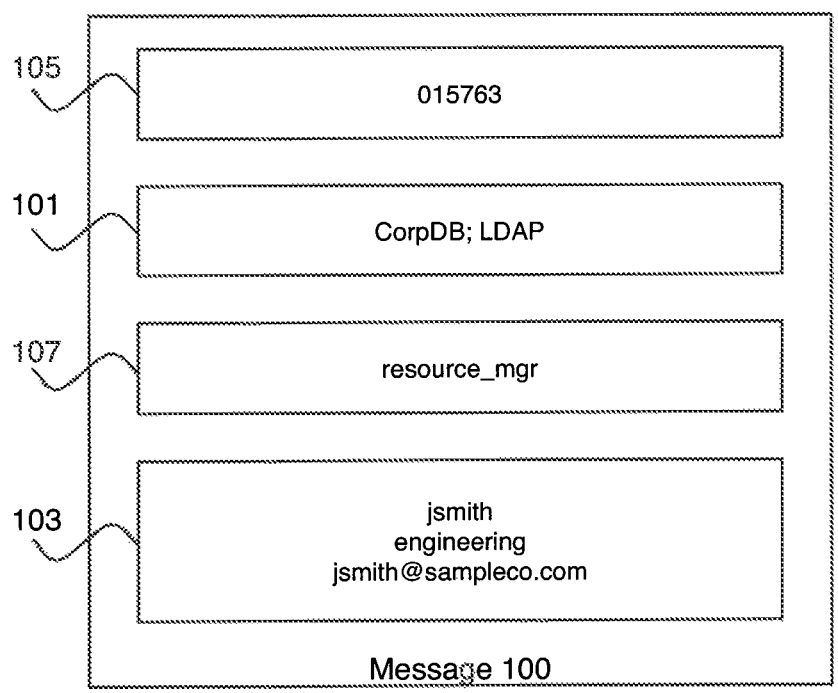
FIG. 1 is a diagram of a message in accordance with an embodiment.

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Employees of businesses may have computer accounts tied to various services. For example, an individual employee's computer account may be tied to her e-mail address, a directory service, and a service that controls her login information. Creation and management of such accounts is typically performed by an account management system that includes one or more individual account servicers. Account management systems also may be used to modify aspects of the employee's account or delete the employee's account.

Each service in an account management system may be controlled by an account servicer. Examples of account servicers may include, but are not limited to, an electronic mail server, a directory server (such as an LDAP server), an access control server, or any other type of server. An account management system may also include a corporate database which is an authoritative source of information for all employees in a business.

A directory server, for example, may create a unique user identification for a new employee. If a new employee John Q. Smith joins a business, the directory server may create the user identification "jqsmith" for the user. The directory server may create the user identification upon receiving an instruction to do so from a corporate database. Similarly, an electronic mail server may create an electronic mail address for the user of "jqsmith@example.com".

In many account management systems, each account servicer may have dependencies on other account servicers. For example, the electronic mail server may depend on information from a directory server. In the above example, the electronic mail server may not create the electronic mail account for the new employee until his user identification is created. Similarly, if a modification is necessary, the electronic mail server may not modify the user's account until it has been modified in the directory server. If the user's account is to be deleted, the mail server may be able to delete the account without waiting for the directory server to do so.

In a typical system, the responsibility of enforcing dependencies may fall on a centralized system. For example, a centralized system may first send a message solely to a directory server for creation of an account. After the directory server creates the user's account, for example, by creating a unique identification for the user, the directory server may send a message to a central system indicating that the task is complete. The central server may then recognize that the electronic mail server can create an electronic mail account for the user. However, a centralized system may not be ideal. For example, the centralized server may be a single point of failure in an account management system, which may limit performance of such a system. Further, if dependencies for a particular account servicer change, the centralized server must be made aware of such a change.

Enforcing such dependencies in a decentralized manner may be accomplished using a publish/subscribe framework in accordance with embodiments. Typically, messages in a publish/subscribe framework are sent by publishers without knowledge of the subscribers, or recipients, of each message. Subscribers may identify interest in one or more topics or classes of messages, and may only receive or act on messages that match a particular keyword or that correspond to a topic.

Thus, in embodiments, subscribers, or account servicers, receive messages from a resource manager acting as a publisher. Account servicers may not act on a message unless it is appropriate for an account servicer to do so, based on the topic of a message and whether the contents of the message match a keyword. The keyword ensures that dependencies are followed by the account servicer. Keywords are maintained by the individual account servicer. In this way, the dependencies may be distributed. Further, dependencies may be changed by individual account servicers without having to update a centralized server.

Each message in a publish/subscribe environment, in accordance with an embodiment, may contain one or more distinct fields. FIG. 1 is a diagram of an example message 100 in a publish/subscribe environment. Message 100 includes keywords 101. Keywords 101 may be used in some embodiments to resolve dependencies, as will be described further herein. Message 100 also includes message content 103. Message content 103 may include information used by account servicers in a publish/subscribe environment, such as a user name or other information for an account to be created, deleted, or modified in some way. Message 100 also includes unique identifier 105. Unique identifier 105 may distinguish a message 100 from other messages sent and received in a publish/subscribe environment. Message 100 also may include or be associated with a topic 107, which will be further described herein.

Figure 2:
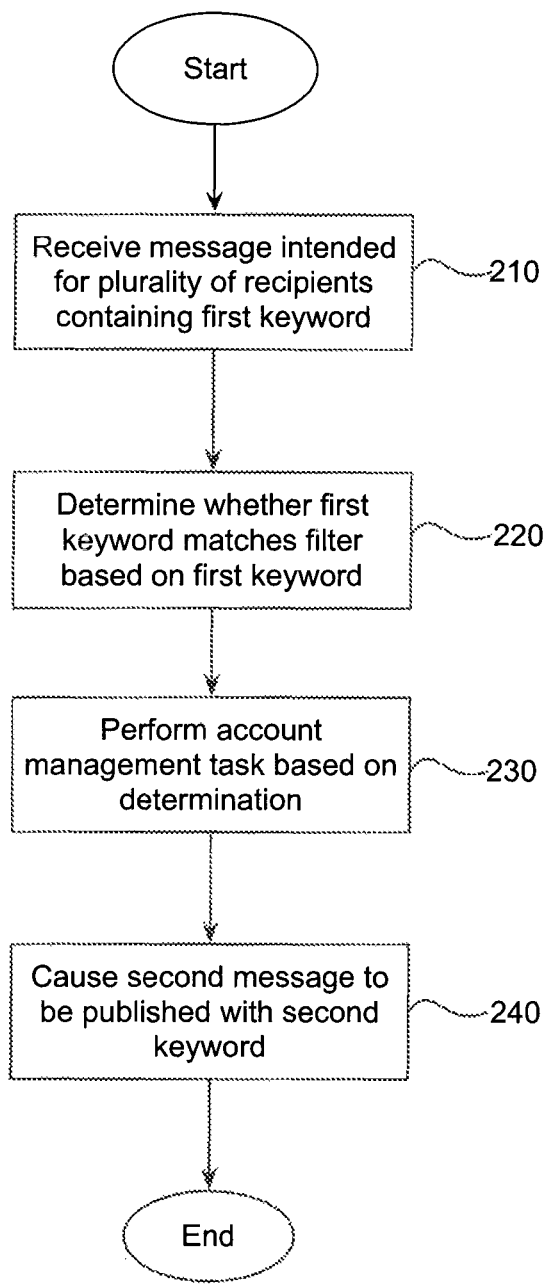
FIG. 2 is a diagram of a method for resolving dependencies in accordance with an embodiment.

FIG. 2 is a flow diagram of a method 200 for performing an account management task for an account while enforcing dependencies, in accordance with an embodiment. At block 210 of method 200, a message intended for a plurality of recipients is received by a first account servicer. The message includes a keyword associated with the source of the message, and an element of account data. The element of account data may be, for example, a user name or user identification, and other information necessary for an account. As in the publish/subscribe model, the message may be distributed to as many subscribers as exist. The message may be received from a source account servicer, or may have been caused to be published by a source account servicer. For example, the message may be received by a first account servicer, such as a directory server, from a source account servicer such as a corporate database.

At block 220, a determination is made as to whether the first message matches a keyword. In one embodiment, a determination may be made as to whether the message matches a filter based on the keyword. The determination may be made by the account servicer, or by a comparator module associated with the account servicer.

At block 230, if the first message matches the keyword, the first account servicer performs an account management task. The account management task may be based on the content of the first message. For example, the first message may indicate that an account should be created, deleted, or modified in some way. Further, as described with reference to block 210, the message may include the user name or user identification for the account to be created, deleted, or modified.

At block 240, after the first account servicer performs the account management task, the first account servicer causes a second message to be published. The second message includes the first message and a second keyword associated with the first account servicer. For example, the second message may indicate, as with the first message, that an account should be created, deleted, or modified in some way, and may include the user name or user identification for the account to be created, deleted, or modified. Further, the second message may include a second keyword associated with the first account servicer, which denotes that the first account servicer has previously performed an account management task related to the message.

In an embodiment, the second message is then received by a second account servicer. The second account servicer, for example, may be an electronic mail server. As above, the second message may refer to a source account servicer. For example, the second message may include a keyword or an identification of a source account servicer. The source account servicer may be the first account servicer, such as the directory server, as described with reference to method 200. The second account servicer determines whether the second message matches a keyword. The determination may be made by the second account servicer, or by a comparator module associated with the second account servicer. For example, the second account servicer (i.e. the electronic mail server) may determine whether the second message matches a keyword to determine whether another account servicer (i.e. the directory server) has performed an account management task related to the message.

If the second message matches the keyword, the second account servicer performs an account management task based on the content of the second message. Once the second account servicer has performed its task, it may cause a third message to be published. The third message includes the second message and a third keyword associated with the second account servicer.

Subscribers in a publish/subscribe may limit or control the messages they receive by subscribing to a topic. Thus, in one embodiment, each message published by the resource manager may further be associated with a topic. The topic may be controlled by the resource manager. Messages published by account servicers or caused to be published by account servicers may further be published on a different topic. The resource manager may subscribe to the topic of messages published by account servicers, and may be the only recipient of messages published on this topic. The resource manager may then publish messages on its topic based on the messages published on the topic of messages published by account servicers. Account servicers may subscribe to the resource manager topic and receive such messages from the resource manager. This may ensure that account servicers only act on messages published by the resource manager by limiting the messages that they receive. Further, this may ensure that modifications to the message are appropriate and do not represent security risks. For example, if an account servicer is compromised, it may cause malicious messages to be published on a separate topic, for example, in an attempt to compromise other account servicers. Messages published on this topic may be ignored by both the resource manager and the account servicers. Thus, by only subscribing to the topic controlled by the resource manager, each account servicer may ensure that received messages are not malicious.

In some embodiments, the resource manager may perform other tasks, such as tracking the status of messages. For example, the resource manager may be able to track the process of an account creation. In some embodiments, a resource manager may not be necessary. For example, in some embodiments, access control lists may be used to limit subscribers and publishers of particular messages.

In some embodiments, the comparator module may be associated with multiple account servicers, and may be implemented as part of a resource manager or other component of a publish/subscribe system. In such embodiments, individual subscribers, or account servicers, may be responsible for setting appropriate filters based on keywords, or may be responsible for matching appropriate keywords, such that the particular subscriber or account servicer receives messages with those keywords. Further, publishers of messages may be responsible for publishing messages with appropriate keywords.

Each keyword may be associated with a particular level in an account servicer hierarchy. The hierarchy represents the various dependencies of the account servicers. For example, the corporate database may be at the top of the hierarchy, while individual account servicers may be at various lower levels of the hierarchy, based on their dependencies on other account servicers. As each account servicer performs an account management task in response to a received message, a keyword associated with the account servicer is added to the message. Thus, if a particular message contains three keywords, that may represent that the account servicer that responds to such a message is at the third level of the hierarchy.

Each message published by the resource manager or other component may further contain a unique identification. The unique identification may ensure consistency in the system. For example, the unique identification may be used to ignore duplicate messages. The first message that is received with a unique identification may be acted upon. A subsequent message with the same unique identification may be considered a duplicate message and ignored.

Figure 3:
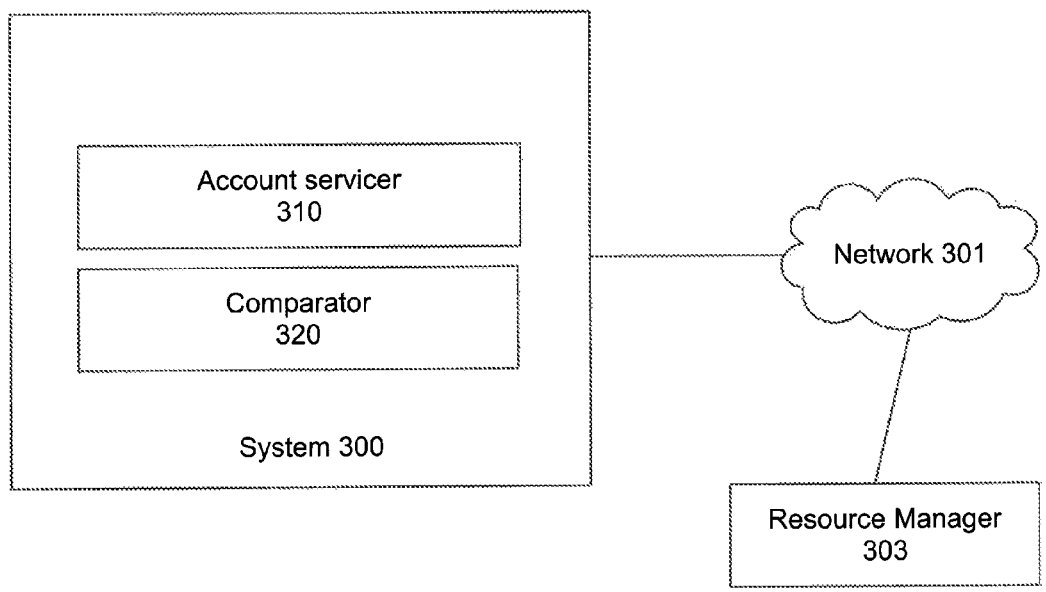
FIG. 3 is a diagram of a system for resolving dependencies in accordance with embodiments.

FIG. 3 is a diagram of an exemplary system 300 which may be used to implement embodiments. System 300 is connected to network 301. Network 301 may be a local area network or wide area network such as the Internet. System 300 is also connected to resource manager 303 by way of network 301.

System 300 receives messages published by resource manager 303, in accordance with block 210 of method 200. System 300 may include account servicer 310. As described above, account servicer 310 may be any type of server or other computer network related device that is responsible for account-related actions or management. For example, account servicer 310 may be an electronic mail server, an LDAP server, an AD server, a Kerberos server, an authentication server, an access control server, or any other type of account servicer used in a computer networking environment.

System 300 also includes comparator 320. Comparator 320 may determine whether a message received by system 300 matches a keyword included with the message, in accordance with block 220 of method 200. Account servicer 310 of system 300 may then perform an account management task based on the determination of comparator 320, in accordance with block 230 of method 200. Account servicer 310 may further cause a second message to be published by resource manager 303, in accordance with block 240 of method 200.

System 300 may be implemented in software, firmware, hardware, or any combination thereof. The system 300 can be implemented to run on any type of processing device including, but not limited to, a computer, workstation, distributed computing system, embedded system, stand-alone electronic device, networked device, mobile device, set-top box, television, kiosk device, or other type of processor or computer system. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Figure 4:
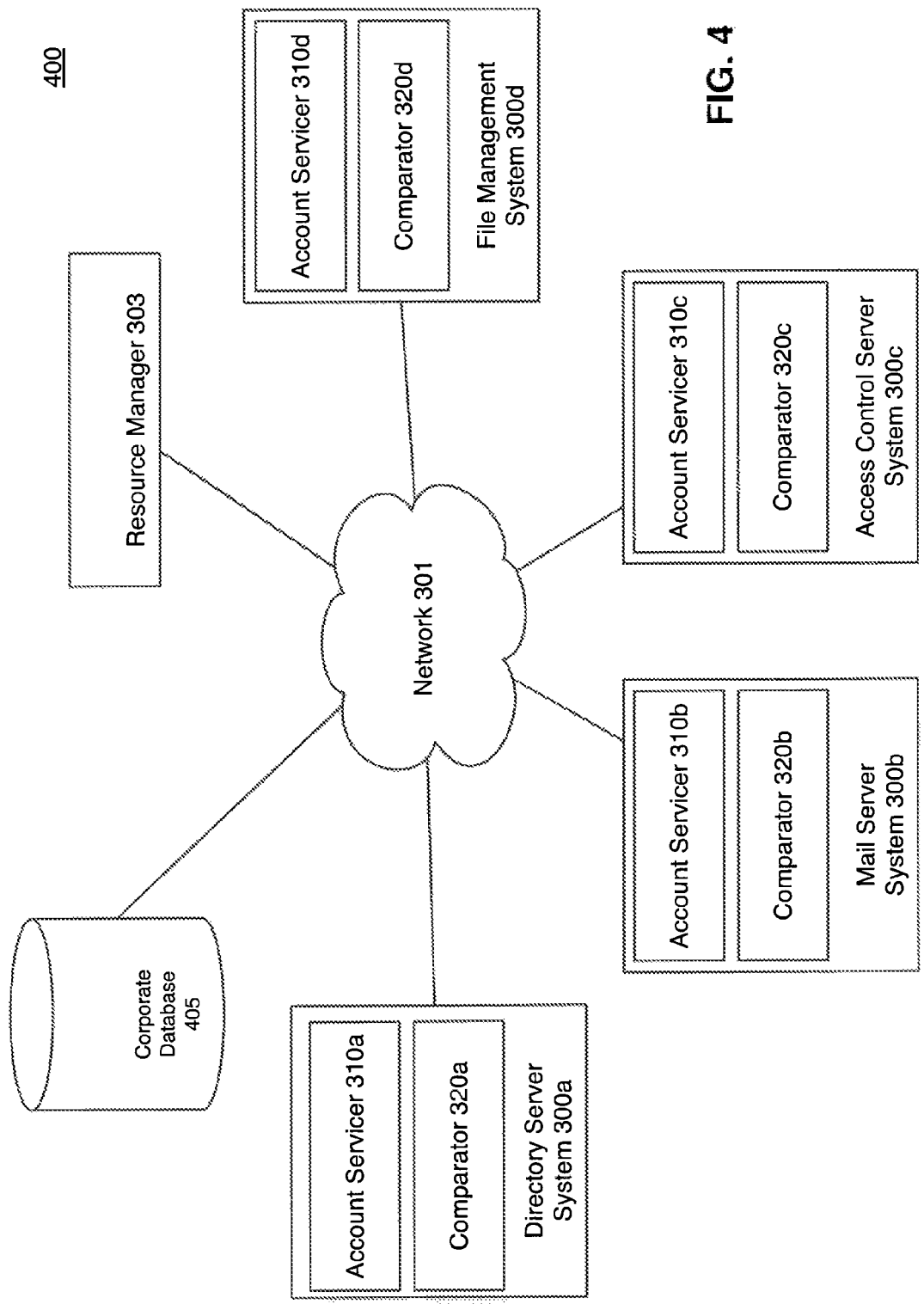
FIG. 4 is a diagram of an account management environment in accordance with embodiments.

FIG. 4 is a diagram of an example environment 400 in which method 200 may be executed. A business may have a corporate database 405 which is an authoritative source of all employee information. Systems 300a-300d include account servicers 310a-310d, as described herein. Each of systems 300a-300d may have certain dependencies that must be resolved before the individual system can perform an account management task. For example, a mail server system 300b may not be able to perform an account management task until an account is set up in a directory server 300a. Similarly, an access control server system 300c may not be able to perform an appropriate account management task until an account is set up in a directory server and a mail serve'. Resource manager 303, as described above, may publish messages to be received by each of systems 300a-300d. Systems 300a-300d, corporate database 405, and resource manager 303 are connected by network 301, which may be a local area network or wide area network such as the Internet.

In the example of FIG. 4, the corporate database 405 causes a first message to be published by resource manager 303. The first message published by resource manager 303 may include elements of account data, such as a user's name associated with an account, as well as other details, such as a business unit or department associated with the account.

In accordance with block 210 of method 200, the first message published by resource manager 303 is received by each of systems 300a-300d, each of which includes an account servicer, as described above. Messages may be received by an agent for each account servicer in some embodiments.

Each system 300a-300d has an appropriate comparator 320a-320d or that matches a keyword for its specific account servicer 310a-310d. For example, a comparator 320a for directory server system 300a may determine whether a keyword associated with a message matches the string "Create:CorpDB". A comparator 320b for mail server system 300b may determine whether a keyword associated with a message matches the string "Create:CorpDB,Directory".

The first message published by resource manager 303 may be associated with the keyword "Create:CorpDB", as the message may have been published by the corporate database 405. In this example, the corporate database 405 is the source account servicer. Accordingly, the message may match a keyword specified by comparator 320a of system 300a, in accordance with block 220 of method 200. Account servicer 310a then performs an account management task, in accordance with block 230 of method 200. In the example environment of FIG. 4, system 300a is a directory server. The account servicer 310a for the directory server system 300a creates an account for the new employee, and creates a unique username for the employee.

Once system 300a has completed its account management task, it causes resource manager 303 to publish a second message in accordance with block 240 of method 200. The second message, in accordance with embodiments, includes the contents of the first message, as well as a keyword associated with system 300a. In embodiments, the second message may also contain data generated by system 300*a*, for example, the username created by account servicer 310*a*. In this example, the keyword associated with the message may be, for example, "Create:CorpDB,Directory", as the message was originally received from the corporate database, and subsequently, directory server system 300*a* performed an account management task. Directory server system 300*a* is then considered the source account servicer for the message. Resource manager 303 publishes the message such that it is received by each of systems 300*a*-300*d*.

Upon receiving the message, system 300*b* may determine that a keyword of the second message matches a keyword associated with the system 300*b*. For example, a comparator 320*b* of system 300*b* may determine that a keyword of the received message matches the keyword "Create:CorpDB,Directory". In accordance with block 230 of method 200 then, account servicer 310*b* performs an account management task. For example, system 300*b* may be a mail server, and account servicer 310*b* may create a mailbox for the new employee. Mail server system 300*b* then causes a third message to be published, in accordance with embodiments, the third message indicating that a task has been performed by system 300*b*.

Because each system that has performed a task is listed in the published messages, keywords and comparator modules can be set so that each system only acts on the message when the time is appropriate for it to do so. When a message does not match a system's keyword, the system does not act, but when a message does match the system's keyword, the system takes action.

Keywords for each account servicer may also be used for messages that instruct account servicers to modify or delete accounts. Dependencies for account modifications and account deletions may be different from dependencies for account creations. Thus, for example, an access control server may have a keyword for account creations that depends on the corporate database and a directory server, and thus may match messages with the string "Create:CorpDB,Directory" However, the access control server may only depend on the corporate database for messages that instruct it to delete an account. Thus, the access control server may take deletion actions on messages that match the keyword "Delete:CorpDB"

While various embodiments have been described with reference to account management systems, some embodiments may be implemented in other types of distributed computing systems that require dependencies between various individual systems that make up the distributed computing system. Each individual system of the distributed computing system may be considered to be a subscriber to messages.

Thus, for example and without limitation, embodiments may be used in a distributed storage system requiring dependencies between individual storage systems in the distributed storage system. In such an example, one storage system in the distributed storage system may not be able to delete an element of data until another storage system has stored the element of data.

Thus, in one embodiment, a first subscriber receives messages intended for a plurality of recipients. The first subscriber is responsible for one or more tasks in a distributed computing system. The first message includes an element of data and a keyword associated with a source publisher. The first subscriber determines whether the message matches a keyword.

If the message matches the keyword, the first subscriber performs an appropriate task based on the first message. In the example of a distributed storage system above, the first subscriber may be a storage system that stores the element of data in response to the message. After performing its task, the first subscriber then causes a second message to be published. The second message includes the first message and a second keyword associated with the first subscriber.

The second message is then received by a second subscriber. The second message is associated with a second source publisher, which may be the first subscriber as described above. The second subscriber determines whether the second message matches a keyword.

If the second message matches the keyword, the second subscriber performs a task based on the content of the second message. For example, in a distributed storage system, the second subscriber may be instructed to delete an element of data. The second subscriber may delete the element of data once the dependency on the first subscriber is resolved, as evidenced by the keywords included with the second message. Once the second subscriber has performed its task, it may cause a third message to be published. The third message includes the second message and a third keyword associated with the second subscriber.

Figure 5:
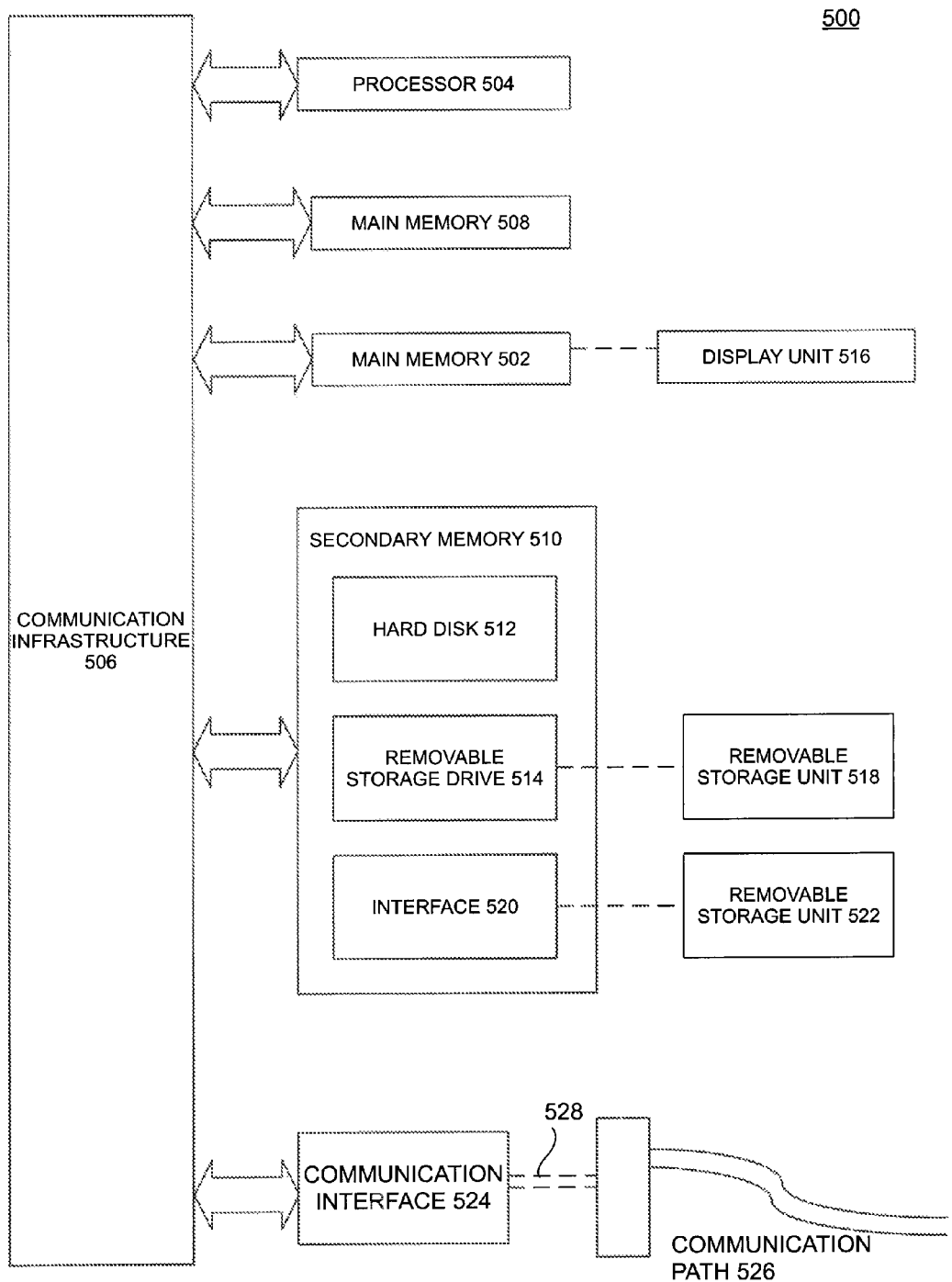
FIG. 5 is a diagram of an example computer system that can be used in embodiments.

Various aspects described herein can be implemented by software, firmware, hardware, or a combination thereof. FIG. 5 illustrates an example computer system 500 in which the embodiments, or portions thereof, can be implemented as computer-readable code. For example, system 300 carrying out method 200 of FIG. 2 can be implemented in system 500. Various embodiments of the invention are described in terms of this example computer system 500.

Computer system 500 includes one or more processors, such as processor 504. Processor 504 is connected to a communication infrastructure 506 (for example, a bus or network).

Computer system 500 also includes a main memory 508, preferably random access memory (RAM), and may also include a secondary memory 510. In accordance with implementations, user interface data may be stored, for example and without limitation, in main memory 508. Secondary memory 510 may include, for example, a hard disk drive and/or a removable storage drive. Removable storage drive 514 may include a floppy disk drive, a magnetic tape drive, an optical disk drive, a flash memory, or the like. The removable storage drive 514 reads from and/or writes to removable storage unit 518 in a well-known manner. Removable storage unit 518 may include a floppy disk, magnetic tape, optical disk, etc. which is read by and written to by removable storage drive 514. As will be appreciated by persons skilled in the relevant art(s), removable storage unit 518 includes a computer readable storage medium having stored therein computer software and/or data.

Computer system 500 may also include a main memory 502. Main memory 502 may include, for example, cache, and/or static and/or dynamic RAM. Main memory 502 may be separate from main memory 508 or may be a part thereof. Main memory 502 may be adapted to communicate with display unit 516. Display unit 516 may comprise a computer monitor or similar means for displaying graphics, text, and other data received from main memory 502. In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals which may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the term "computer readable storage medium" is used to generally refer to media such as removable storage unit 518, removable storage unit 522, and a hard disk installed in hard disk drive 512. Computer readable storage medium can also refer to one or more memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524 and stored on main memory 508 and/or secondary memory 510. Such computer programs, when executed, enable computer system 500 to implement the implementations as discussed herein. In particular, the computer programs, when executed, enable processor 504 to implement the processes of the present disclosure, such as the steps in the methods discussed above. Accordingly, such computer programs represent controllers of the computer system 500. Where implementations use software, the software may be stored in a computer program product and loaded into computer system 500 using removable storage drive 514, interface 520, or hard drive 512.

Embodiments may be directed to computer program products comprising software stored on any computer readable medium. Such software, when executed in one or more data processing device, causes a data processing device(s) to operate as described herein. Embodiments may employ any computer useable or readable medium. Examples of non-transitory computer readable storage media include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nanotechnological storage device, etc.). Other computer readable media include communication mediums (e.g., wired and wireless communications networks, local area networks, wide area networks, intranets, etc.).

The summary and abstract sections may set forth one or more but not all exemplary embodiments of the present invention as contemplated by the inventor(s), and thus, are not intended to limit the present invention and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method in an account management system, comprising:
    receiving, by a first account servicer, a first message intended for a plurality of recipients, each recipient being responsible for one or more account management tasks, wherein the first message comprises an element of account data and a first keyword associated with a source account servicer;
    determining, by the first account servicer, whether the first message matches the first keyword;
    performing, by the first account servicer, an account management task when the first message matches the first keyword, wherein the account management task is based on the first message; and
    causing, by the first account servicer, a second message intended for the plurality of recipients to be published, wherein the second message comprises the first message and a second keyword associated with the first account servicer, and wherein each of the plurality of recipients determines whether to perform an additional account management task based on the second message.

2. The method of claim 1, wherein the source account servicer is a first source account servicer, the account management task is a first account management task, and further comprising:
    receiving, by a second account servicer, the second message intended for the plurality of recipients, wherein the second message is associated with a second source account servicer;
    determining, by the second account servicer, whether the second message matches the second keyword;
    performing, by the second account servicer, a second account management task when the second message matches the second keyword, wherein the second account management task is based on the second message; and
    causing, by the second account servicer, a third message to be published, wherein the third message comprises the second message and a third keyword associated with the second account servicer, wherein the second source account servicer is the first account servicer.

3. The method of claim 1, wherein each message is associated with a topic.

4. The method of claim 3, further comprising subscribing to a particular topic, wherein the first message and second message are associated with the particular topic.

5. The method of claim 1, wherein each keyword is associated with a particular level in an account servicer hierarchy.

6. The method of claim 1, wherein each message further comprises a unique identifier.

7. A system for account management, comprising:
one or more processors;
a memory;
a first account servicer, implemented on the one or more processors, that receives a first message intended for a plurality of recipients, each recipient being responsible for one or more aspects of account management, wherein the first message comprises an element of account information and a first keyword associated with a source account servicer; and
a comparator, implemented on the one or more processors, that determines whether the first message matches the first keyword, wherein the first account servicer further performs an account management task based on the determination of the comparator and causes a second message intended for the plurality of recipients to be published, wherein the second message comprises the first message and a second keyword associated with the first account servicer, and wherein each of the plurality of recipients determines whether to perform an additional account management task based on the second message.

8. The system of claim 7, wherein the source account servicer is a first source account servicer, the account management task is a first account management task, the comparator is a first comparator, and further comprising:
a second account servicer, implemented on the one or more processors, that receives the second message, intended for a plurality of recipients, wherein the second message is associated with a second source account servicer; and
a second comparator, implemented on the one or more processors, that determines whether the second message matches the second keyword, wherein the second account servicer further performs a second account management task based on the determination of the second comparator and causes a third message to be published, wherein the third message comprises the second message and a third keyword associated with the second account servicer, and wherein the second source account servicer is the first account servicer.

9. The system of claim 7, wherein each message is associated with a topic.

10. The system of claim 7, wherein each keyword is associated with a particular level in an account servicer hierarchy.

11. The system of claim 7, wherein each message further comprises a unique identifier.

12. A non-transitory computer readable storage medium having instructions stored thereon that, when executed by a processor, cause the processor to perform operations comprising:
receiving, by a first account servicer, a first message intended for a plurality of recipients, each recipient being responsible for one or more account management tasks, wherein the first message comprises an element of account data and a first keyword associated with a second account servicer;
determining, by the first account servicer, whether the first message matches the first keyword;
performing, by the first account servicer, an account management task when the first message matches the first keyword, wherein the account management task is based on the first message; and
causing, by the first account servicer, a second message intended for the plurality of recipients to be published, wherein the second message comprises the first message and a second keyword associated with the first account servicer, and wherein each of the plurality of recipients determines whether to perform an additional account management task based on the second message.

13. The non-transitory computer readable storage medium of claim 12, wherein the source account servicer is a first source account servicer, the account management task is a first account management task, and further comprising:
receiving, by a second account servicer, the second message intended for the plurality of recipients, wherein the second message is associated with a second source account servicer;
determining, by the second account servicer, whether the second message matches the second keyword;
performing, by the second account servicer, a second account management task when the second message matches the second keyword, wherein the second account management task is based on the second message; and
causing, by the second account servicer, a third message to be published, wherein the third message comprises the second message and a third keyword associated with the second account servicer, wherein the second source account servicer is the first account servicer.

14. The non-transitory computer readable storage medium of claim 12, wherein each message is associated with a topic.

15. The non-transitory computer readable storage medium of claim 12, the operations further comprising subscribing to a particular topic, wherein the first message and second message are associated with the particular topic.

16. The non-transitory computer readable storage medium of claim 12, wherein each keyword is associated with a particular level in an account servicer hierarchy.

17. The non-transitory computer readable storage medium of claim 12, wherein each message further comprises a unique identifier.

18. A computer-implemented method in a publish/subscribe system, comprising:
receiving, by a first subscriber, a first message intended for a plurality of recipients, each recipient being responsible for one or more tasks, wherein the first message comprises an element of data and a first keyword associated with a source publisher;
determining, by the first subscriber, whether the first message matches the first keyword;
performing, by the first subscriber, a task when the first message matches the first keyword, wherein the task is based on the first message; and
causing, by the first subscriber, a second message to be published intended for plurality of recipients, wherein the second message comprises the first message and a second keyword associated with the first subscriber, and wherein each of the plurality of recipients determines whether to perform an additional account management task based on the second message.

19. The method of claim 18, wherein the source publisher is a first source publisher, the task is a first task, and further comprising:
receiving, by a second subscriber, the second message intended for the plurality of recipients, wherein the second message is associated with a second source publisher;
determining, by the second subscriber, whether the second message matches the second keyword;

performing, by the second subscriber, a second task when the second message matches the second keyword, wherein the second task is based on the second message; and causing, by the second subscriber, a third message to be published, wherein the third message comprises the second message and a third keyword associated with the second subscriber, wherein the second source publisher is the first subscriber.

* * * * *